Feb. 13, 1945.  G. WEGENER ET AL  2,369,625
SYNCHRONIZING ARRANGEMENT
Filed Oct. 10, 1941
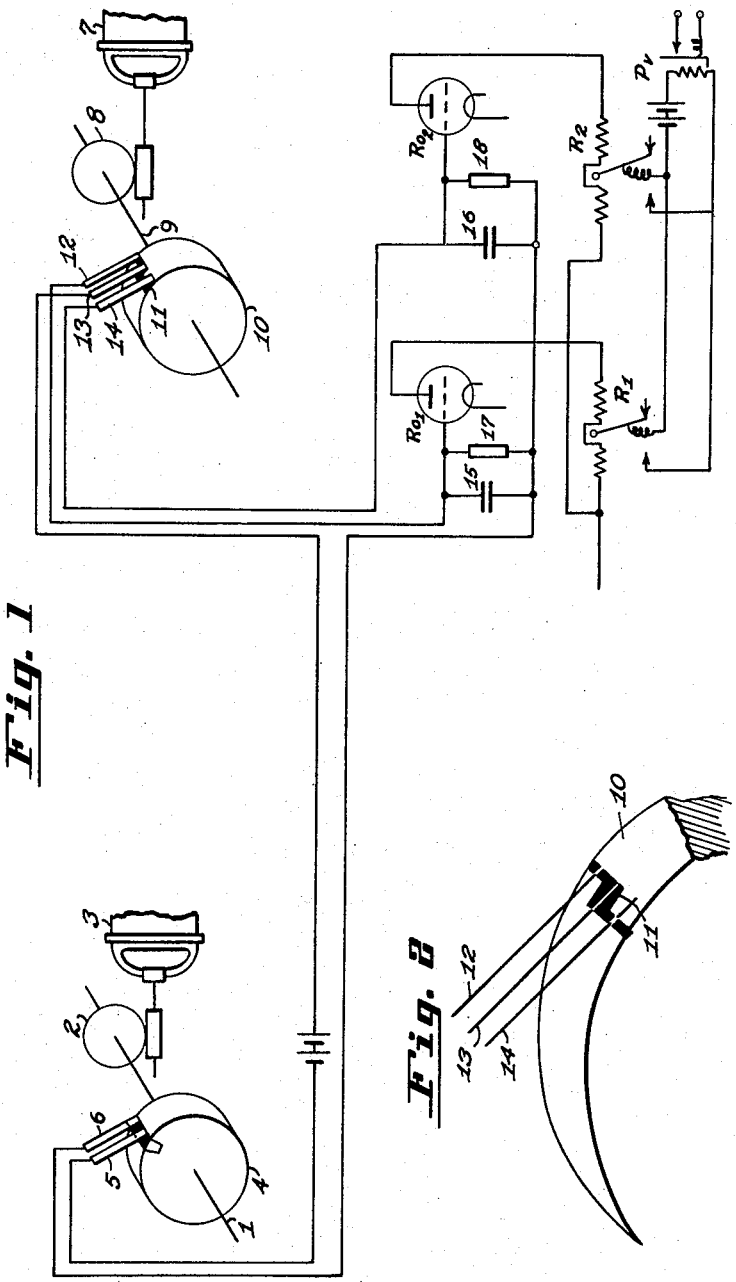
Inventors
GUSTAV WEGENER
WILHELM SCHEPPMANN
By
Attorney.

Patented Feb. 13, 1945

2,369,625

UNITED STATES PATENT OFFICE 2,369,625

SYNCHRONIZING ARRANGEMENT

Gustav Wegener and Wilhelm Scheppmann, Berlin, Germany; vested in the Alien Property Custodian Application October 10, 1941, Serial No. 414,482
In Germany June 28, 1940

2 Claims. (Cl. 178—69.5)

This invention relates to a synchronizing arrangement for printing telegraph systems and the like and has for its object the provision of a simple circuit arrangement by which two rotary members may be kept in proper phase relationship.

The present invention is concerned with a novel arrangement for obtaining the correct phase position of two synchronously running shafts. In this arrangement, a phase signal is detected from an irregular series of signals of the same kind by a contact arrangement comprising two contacts mounted on the controlled shaft. In the event of phase coincidence of the shafts one of these contacts acts to test the commencement of the phase signal while the other contact is to test the end thereof. The transmission of the phase signal also takes place when the sender is emitting irregular signals, such as telegraph signals, for instance. The phase signal even if transmitted together with other signals, as telegraph signals, insures that the controlled shaft of the receiver assumes the correct phase position, provided that the shaft of the sender and that of the receiver run synchronously with each other.

In the drawing, Fig. 1 is a circuit diagram showing one embodiment of the invention, Fig. 2 is a schematic detail view which illustrates in perspective a contact device of the arrangement represented in Fig. 1.

1 denotes the control shaft of the sender. This shaft is arranged to be driven by a motor 3 through gearing 2. 7 denotes a motor of the receiver. In order to synchronize the motors 3, 7 with each other any well known speed regulating device may be employed, or the motors may be connected to an existing synchronizing network. Shaft 1 carries an impulsing device comprised of a contact disc 4 and brushes 5, 6.

The controlled shaft 9 of the receiver is connected with motor 7 through gearing 8. Shaft 9 carries a contact disc 10 provided with a circumferential contact members 11 shown apart in Fig. 2 the two contacts occupying an angular distance equal to that of the contact on the transmitting drum. Brushes 12, 13, 14 are arranged to contact with the circumference of the disc 10. Member 11 is so shaped that either the brushes 13, 12 or the brushes 13, 14 shall contact therewith. The brushes 12, 14 are joined to storing devices 15 or 16, respectively, which can discharge across grid leak resistances 17, 18 of electron tubes $Ro_1$, $Ro_2$. Relays $R_1$, $R_2$ in the anode circuits of these tubes are arranged to control a relay $Pv$ that serves to initiate phase displacement of shaft 9.

When the shafts 1, 9 are running synchronously the impulsing device 4, 5, 6 after each revolution of disc 4 emits an impulse or so-called phase signal to the contact device 10, 11, 12, 13, 14. If the shafts 1, 9 are cophasal in position the phase signal is conveyed to the contact member 11 by brush 13. With the condition shown in the drawing part of this impulse is conveyed to the storing device 15 and is stored here. Device 15 at once discharges across resistance 17 and thereby varies the anode current of tube $Ro_1$ in such a manner that relay $R_1$ assumes the condition represented in the drawing. The time constant of such discharge is so chosen that during one revolution of shaft 9 relay $R_1$ remains in this condition so that relay $Pv$ is not actuated. As a result, the phase position of shaft 9 is not varied. On further rotation of the disc 10 the brush 12 leaves the contact member 11 while brush 14 comes to contact therewith. Brush 14 conveys part of the phase impulse to the storing device 16, which at once discharges across resistance 18 and thereby varies the anode current of tube $Ro_2$ in such a manner that relay $R_2$ too assumes the condition represented in the drawing. Also in this case, therefore, relay $Pv$ is not actuated and shaft 9 hence not subjected to phase variation.

If the phase position of the shafts 1, 9 is not correct then the phase impulse fails to reach the contact member 11 in the requisite manner. The storing devices 15, 16 hence will receive incomplete or no impulses, depending upon the phase difference between the shafts 1, 9. In cases where no impulses can act on the storing devices 15, 16 the relays $R_1$, $R_2$ will switch their contacts and in this way actuate the phase-adjusting device by means of relay $Pv$ until regular impulses are derived from the phase signal to act on 15, 16. The correct phase position of the two shafts then has been established.

If shaft 9 is driven a trifle faster than shaft 1 of the transmitter, the phase adjusting device will act, according to known practice, to retard shaft 9 until the phase adjusting device is disabled by the operation of relays $R_1$ and $R_2$ to the positions shown in the drawing in which $Pv$ is unoperated. In a different arrangement where the receiver shaft 9 is turning a trifle slower than the transmitter shaft, then the phase adjusting device must be of a kind to accelerate shaft 9 so long as relay $Pv$ is operated.

It will be understood that the lines connecting the transmitter and receiver are telegraph lines and that these units are remote from each other.

As the phase signal is produced after each revolution of shaft 1, thus being of periodic nature, this impulse will distinguish from impulses of irregular occurrence, as telegraph signals, for instance, and will hence be easy to detect from a series of signal impulses.

What is claimed is:

1. A synchronizing arrangement for printing telegraph systems and the like comprising a telegraph circuit, a rotary transmitter shaft, a contact on said shaft for transmitting a synchronizing impulse once each revolution, a rotary receiver shaft moving at a slightly different rate from that of the transmitter shaft, a drum on said receiver shaft, a pair of contacts disposed on said drum angularly displaced from each other, a brush in said telegraph circuit adapted to engage said contacts in succession, a pair of vacuum tubes each having an anode circuit including a relay and an input circuit including a grid, a grid leak and condenser, a brush in each grid circuit adapted to engage one of said contacts on said receiver drum, to charge the associated condenser and thereby cause said tube to hold the associated relay in operated condition for the duration of the condenser discharge, a third relay operable from either of said relays adapted to control a phase correcting device for said receiver shaft, said third relay being positioned so as to disconnect the phase correcting device when both of the first mentioned relays are operated by their vacuum tubes.

2. A synchronizing arrangement according to claim 1 in which the time constant of said condensers and grid leaks is such as to hold the associated relay operated for the duration of one revolution after a condenser has been charged.

GUSTAV WEGENER.
WILHELM SCHEPPMANN.